US012725054B2

(12) United States Patent
Stepanova et al.

(10) Patent No.: US 12,725,054 B2
(45) Date of Patent: Sep. 1, 2026

(54) APPARATUS AND COMPUTER-IMPLEMENTED METHOD FOR CORRECTING INCONSISTENT FACTS IN A KNOWLEDGE BASE

(71) Applicant: Robert Bosch GmbH, Stuttgart (DE)

(72) Inventors: Daria Stepanova, Leonberg (DE); Hiba Arnaout, Saarbruecken (DE); Mohamed Gad-Elrab, Saarbruecken (DE); Trung Kien Tran, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 842 days.

(21) Appl. No.: 18/160,132

(22) Filed: Jan. 26, 2023

(65) Prior Publication Data

US 2024/0028918 A1 Jan. 25, 2024

(30) Foreign Application Priority Data

Jul. 25, 2022 (EP) .................................... 22186681

(51) Int. Cl.
*G06N 5/022* (2023.01)
*G06N 5/045* (2023.01)

(52) U.S. Cl.
CPC ............. *G06N 5/022* (2013.01); *G06N 5/045* (2013.01)

(58) Field of Classification Search
CPC ............................... G06N 5/022; G06N 5/045
See application file for complete search history.

(56) References Cited

U.S. PATENT DOCUMENTS

2025/0252324 A1* 8/2025 Marrero ................. G06N 5/022

OTHER PUBLICATIONS

Melo, AndrÃ©, and Heiko Paulheim. “An approach to correction of erroneous links in knowledge graphs.” CEUR Workshop Proceedings. vol. 2065. RWTH Aachen, 2017. (Year: 2017).*
Chen, Jiaoyan, et al. “Correcting knowledge base assertions.” Proceedings of the Web Conference 2020. 2020. (Year: 2020).*
Paulheim, Heiko. “Identifying Wrong Links between Datasets by Multi-dimensional Outlier Detection.” Workshop on Debugging Ontologies and Ontology Mappings—WoDOOM14. 2014. (Year: 2014).*
Grant, John, and Anthony Hunter. “Measuring inconsistency in knowledgebases.” Journal of Intelligent Information Systems 27.2 (2006): 159-184. (Year: 2006).*

(Continued)

*Primary Examiner* — Jennifer N Welch
*Assistant Examiner* — Jake Timothy Breen
(74) *Attorney, Agent, or Firm* — Norton Rose Fulbright US LLP

(57) ABSTRACT

Apparatus and computer-implemented method for correcting inconsistent facts in a knowledge base. The method comprises providing an inconsistent fact, wherein the inconsistent fact comprises a subject and a predicate and an object, determining an input for a language model, wherein the input comprises the subject or a label provided for the subject, wherein the input comprises the predicate or a label provided for the predicate, wherein the object or a label provided for the object is masked in the input, determining an output of the language model depending on the input, wherein the output comprises a predicted object or a predicted label for a predicted object, and replacing the inconsistent fact with a fact comprising the subject, the predicate and the predicted object.

10 Claims, 3 Drawing Sheets

(56) References Cited

OTHER PUBLICATIONS

Liu, Bo, Jianqiang Li, and Yu Zhao. "Repairing and reasoning with inconsistent and uncertain ontologies." Advances in Engineering Software 45.1 (2012): 380-390. (Year: 2012).*

Artale et al., "The DL-Lite Family and Relations," Journal of Artificial Intelligence Research, vol. 36, 2009, pp. 1-69. https://jair.org/index.php/jair/article/view/10623/25404> Downloaded Jan. 25, 2023.

Bengio et al., "A Neural Probabilistic Language Model," Journal of Machine Learning Research, vol. 3, 2003, pp. 1137-1155. <https://www.jmlr.org/papers/volume3/bengio03a/bengio03a.pdf> Downloaded Jan. 25, 2023.

Bergman et al., "QOCO: A Query Oriented Data Cleaning System With Oracles," Proceedings of the VLDB Endowment, vol. 8, No. 12, 2015, pp. 1-4. <https://slavanov.com/research/vldb15.pdf> Downloaded Jan. 25, 2023.

Liu et al., "Roberta: A Robustly Optimized Bert Pretraining Approach," Cornell University, 2019, pp. 1-13. <https://arxiv.org/pdf/1907.11692.pdf> Downloaded Jan. 25, 2023.

Yamada et al., "WIkipedia2VEC: An Efficient Toolkit for Learning and Visualizing the Embeddings of Words and Entities From Wikipedia," Proceedings of the 2020 EMNLP (Systems Demonstrations), 2020, pp. 23-30. <https://aclanthology.org/2020.emnlp-demos.4.pdf> Downloaded Jan. 25, 2023.

Arnaout et al., "Utilizing Language Model Probes for Knowledge Graph Repair," Companion Proceedings of the Web Conference 2022 (WWW '22 Companion), 2022, pp. 1-8. <https://wikiworkshop.org/2022/papers/> WikiWorkshop2022_paper_9.pdf.

Tran et al., "Fast Computation of Explanations for Inconsistency in Large-Scaleknowledge Graphs," 2020 IW3C2 (International World Wide Web Conference Committee), 2020, pp. 2613-2819. <https://dl.acm.org/doi/pdf/10.1145/3366423.3380014> Downloaded Jan. 26, 2022.

* cited by examiner

APPARATUS AND COMPUTER-IMPLEMENTED METHOD FOR CORRECTING INCONSISTENT FACTS IN A KNOWLEDGE BASE

CROSS REFERENCE

The present application claims the benefit under 35 U.S.C. § 119 of European Patent Application No. EP 22 18 6681.7 filed on Jul. 25, 2022, which is expressly incorporated herein by reference in its entirety.

FIELD

The present invention concerns an apparatus and a computer-implemented method for correcting inconsistent facts in a knowledge base.

BACKGROUND INFORMATION

Knowledge bases are important in many applications such as web search, personal assistance, and question answering. Due to their (semi-)automatic construction, knowledge bases often contain erroneous facts.

Existing approaches of error detection and repair, e.g., via ontology-based inconsistency handling methods, repair inconsistencies by removing facts, resulting in undesired information loss.

SUMMARY

The computer-implemented method and the apparatus according to the present invention fix the knowledge base primarily by determining facts that replace inconsistent facts. This reduces an undesired information loss.

According to an example embodiment of the present invention, the computer-implemented method for correcting inconsistent facts in a knowledge base comprises providing an inconsistent fact, wherein the inconsistent fact comprises a subject and a predicate and an object, determining an input for a language model, wherein the input comprises the subject or a label provided for the subject, wherein the input comprises the predicate or a label provided for the predicate, wherein the object or a label provided for the object is masked in the input, determining an output of the language model depending on the input, wherein the output comprises a predicted object or a predicted label for a predicted object, and replacing the inconsistent fact with a fact comprising the subject, the predicate and the predicted object. The language model is pre-trained to map masked input to the output. The output comprises a prediction of the masked part of the masked input. The input may comprise a sentence or sentences. The masked part may be a word or words. The language model may have a Transformer architecture to predict a missing word or missing words in the sentence or in sentences. This method may be applied to facts of an existing knowledge base or to facts for a knowledge base before they are added to an existing knowledge base.

For an existing knowledge base, the method may comprise providing the knowledge base, in particular a knowledge graph, wherein the knowledge base comprises a plurality of facts, wherein providing the inconsistent fact comprises selecting the inconsistent fact from the plurality of facts and/or wherein the method comprises replacing the inconsistent fact in the knowledge base with the fact.

According to an example embodiment of the present invention, determining the input may comprise providing a context for the subject, and providing the input to additionally comprise the context. The context enhances the input with additional information about the subject and leads to an improved prediction by the language model.

According to an example embodiment of the present invention, providing the context for the subject may comprise determining the context from an entry for the subject in another knowledge base and/or selecting the context from a set of entries for the subject in another knowledge base depending on whether the context maps to an entity of the knowledge base that is within a given range of types of entities of the knowledge base in particular a range of types that is provided for the predicate of the fact or the inconsistent fact. This adds context that improves the prediction and removes other context.

According to an example embodiment of the present invention, determining the input may comprise providing a set of subjects, and providing a set of types of subjects, wherein a subject of the set is associated with at least on type of the set of types, wherein providing the context comprises selecting the context to comprise a type from the set of types, in particular wherein the type is selected depending on a result of a comparison of an amount of subjects that are associated with the type to an upper threshold and/or a lower threshold. The amount indicates a relevance of the type for the improvement of the prediction by the language model. Considering the upper threshold, the selected type is either one of the most frequent types or not. Considering the lower threshold, the selected type is either one of the least frequent types or not.

According to an example embodiment of the present invention, the method may comprise determining a set of objects with the language model and selecting the predicted object from the set of objects, or determining a set of labels with the language model and selecting the predicted label from the set of labels.

Selecting the predicted object may comprise determining a confidence score for objects in the set of objects and selecting the object with the highest confidence score as predicted object. Selecting the predicted label may comprise determining a confidence score for labels in the set of labels and selecting the label with the highest confidence score as predicted label. This provides a correction with a fact that is likely correct and mitigates faulty corrections.

According to an example embodiment of the present invention, the method may comprise providing an ontology comprising at least one axiom, and determining, whether the fact contradicts the at least one axiom or not, and if the fact contradicts the at least one axiom, disposing off the inconsistent fact or not replacing the inconsistent fact with the fact, and otherwise replacing the inconsistent fact with the fact. This confirms the fact versus the ontology or discards the fact otherwise.

According to an example embodiment of the present invention, the method may comprises providing an ontology comprising at least one axiom, in particular the aforementioned ontology, wherein providing the inconsistent fact comprises determining a fact that contradicts the at least one axiom as the inconsistent fact. This is one efficient way of identifying the inconsistent fact in the existing knowledge base.

According to an example embodiment of the present invention, the method may comprise determining a set of inconsistent facts comprising the inconsistent fact and correcting the inconsistent facts in the set.

According to an example embodiment of the present invention, the apparatus for correcting inconsistent facts in a knowledge base comprises at least one processor and at least one memory, wherein the at least one memory is configured for storing a knowledge base, in particular a knowledge graph, and an ontology, and a language model computer-readable instructions, that, when executed by the at least one processor, cause the execution of the method, wherein the at least one processor is configured to execute the computer-readable instructions. This apparatus provides the advantages of the method.

According to an example embodiment of the present invention, a computer program for correcting inconsistent facts in a knowledge base, comprises computer-readable instructions that, when executed by a computer, cause the computer to execute the method. This computer program provides the advantages of the method.

Further embodiments are derivable from the following description and the figures.

DETAILED DESCRIPTION OF EXAMPLE EMBODIMENTS

Figure 1:
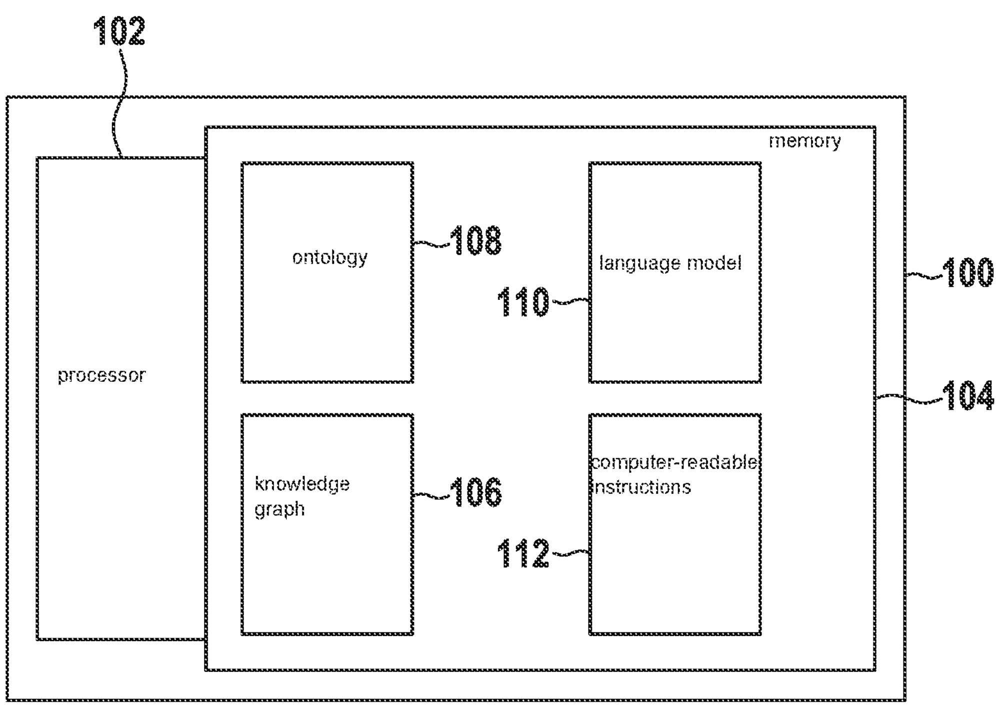
FIG. 1 schematically depicts an apparatus for correcting inconsistent facts, according to an example embodiment of the present invention.

FIG. 1 depicts schematically an apparatus 100 for correcting inconsistent facts.

The apparatus 100 comprises at least one processor 102 and at least one memory 104.

The at least one memory 104 is configured for storing a knowledge base, in particular a knowledge graph 106.

The knowledge graph 106 is for example based on countable pairwise disjoint sets $N_C, N_P, N_I$ wherein $N_C$ is a set that comprises class names, $N_P$ is a set that comprises property names and $N_E$ is a set that comprises entity names. The facts are for example binary triples of the form C(s) and p(s,o), where $C \in N_C$, $p(s,o) \in N_P$ and $s,o \in N_E$.

The set $N_C$ comprises for example more than 100, more than 1000, more than 10000 or more than 100000 class names. The set $N_P$ comprises for example more than 100, more than 1000, more than 10000 or more than 100000 property names. The set $N_E$ comprises for example more than 100, more than 1000, more than 10000 or more than 100000 entity names. The sets $N_C$, $N_P$, $N_E$ may comprise thousands or millions of class names, property names and entity names respectively.

The at least one memory 104 is configured for storing an ontology 108.

An exemplary ontology 108 is described in Artale, A.; Calvanese, D.; Kontchakov, R.; and Zakharyaschev, M. 2014, "The DL-Lite family and relations," CoRR abs/1401.3487. For example the ontology 108 is in DL-$Lite^{S\sqcup}$.

The ontology 108 accompanies the knowledge graph 106. The ontology 108 provides additional background knowledge. The ontology 108 in one example is a finite set of axioms, for example, of the form $C_1 \sqsubseteq C_2, R_1 \sqsubseteq R_2, R_1 \circ R_2 \sqsubseteq R$ in which $C_i, R_i$ comply with the following syntax:

$$C_{(i)} ::= \top | \bot | A | \exists R | C_1 \sqcup C_2 | C_1 \sqcap C_2 | \neg C$$

$$R_{(i)} ::= P | P^-$$

where $A \in N_C$ is an atomic class, i.e. a type, and $P \in N_P$ is an atomic property, i.e. a binary relation.

The knowledge graph 106 is inconsistent with regard to an ontology 106 if at least one fact in the knowledge graph 106 contradicts at least one axiom of the ontology 108.

The at least one memory 104 is configured for storing a language model 110.

The language model 110 is for example a language representation model that has been trained to learn a distributed representation for words/symbols. An exemplary language model 110 is described in Bengio, Y.; Ducharme, R.; Vincent, P.; and Janvin, C. 2003, "A neural probabilistic language model," J. Mach. Learn. Res. Bergman, M.; Milo, T.; Novgorodov, S.; and Tan, W. 2015, "Qoco: A query oriented data cleaning system with oracles," In PVLDB. Another exemplary language model 110 is RoBERTa as described in Liu, Y.; Ott, M.; Goyal, N.; Du, J.; Joshi, M.; Chen, D.; Levy, O.; Lewis, M.; Zettlemoyer, L.; and Stoyanov, V. 2019, "RoBERTa: A robustly optimized bert pretraining approach."

The at least one memory 104 is configured for storing computer-readable instructions 112, that, when executed by the at least one processor 102, cause the execution of a method for correcting inconsistent facts.

The at least one processor 102 is configured to execute the computer-readable instructions.

A computer program for correcting inconsistent facts is for example provided. The computer program comprises the computer-readable instructions 112.

Figure 2:
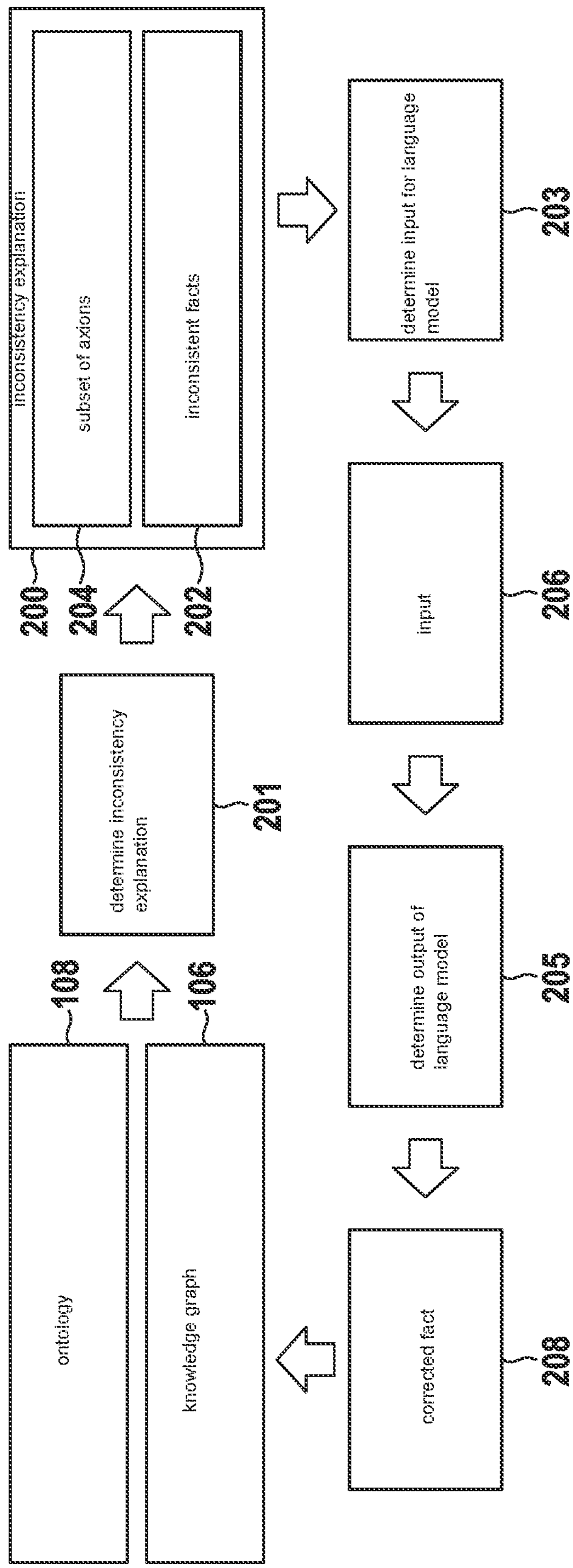
FIG. 2 schematically depicts an example for correcting inconsistent facts, according to an example embodiment of the present invention.

FIG. 2 schematically depicts an example for correcting inconsistent facts in the knowledge graph 106 based on the ontology 108.

The knowledge graph 106 comprises facts that are defined in the example by a triple p(s,o) comprising a subject s, a predicate p and an object o, wherein the predicate p represents a relation of the subject s and the object o.

In the following example, <Name of City> is a name of a city and refers to an entity in the knowledge graph 106 that is assigned with a predicate type to an entity <City>: type(<Name of City>,<City>). In the following example, <Name of Country> is a name of a country that is assigned with the predicate type to an entity <Country>: type(<Name of Country>,<City>). In the following example, <Name of Person> is a name of a person that is assigned with the predicate type to an entity <Person>: type(<Name of Person>,<Person>). In the following example, <Name of Research Field> is a name of a research field that is assigned with a predicate type to an entity <Research Field>: type (<Name of Research Field>,<Research Field>). In the following example, <Name of Institution> is a name of an institution that is assigned with the predicate type to an entity <Institution>: type(<Name of Institution>,<Institution>).

A predicate cityOf in a correct fact indicates that the subject of the fact is a city in a country that the object of the fact indicates. A predicate researchField in a correct fact indicates that the subject of the fact is a person that is active in a activity the object of the fact indicates. A predicate almaMater in a correct fact indicates that the subject of the fact is a person that is associated with an institution the object of the fact indicates. In the example, the knowledge graph 106 comprises the following facts:

cityOf(<Name ofCity>,<Name ofCountry>)

researchField(<Name of Person>,<Name of Research Field>) almaMater(<Name ofPerson>,<Name ofCity>)

The ontology 108 comprises axioms that associate predicates of the knowledge graph 106 with types. In the example, the ontology 108 comprises for the types <City>, <University> and <Person> the following axioms:

∃ cityOf$^{-}$ ⊑ <City>

∃ almaMater$^{-}$ ⊑ <University>

<City> ⊑ ¬ <University>

∃ researchField ⊑ <Person>

These axioms indicate that a subject of a fact comprising the predicate cityOf has to be of the type <City>, a subject of a fact comprising the predicate almaMater has to be of the type <University>, a subject or object of a fact being of type <City> must not be of the type <University>, a subject of a fact comprising the predicate reserearchField has to be of the type <Person>.

According to the example, at least an inconsistency explanation 200 comprising inconsistent facts 202 and at least a subset of the axioms 204 is determined in a step 201 depending on the knowledge graph 106 and the ontology 108.

The inconsistent facts 202 comprise in the example:

almaMater(<Name of Person>,<Name of City>) cityOf (<Name of City>,<Name of Country>)

By way of example, the subset of the axioms 204 comprises

∃ cityOf$^{-}$ ⊑ <City>

∃ almaMater$^{-}$ ⊑ <University>

<City> ⊑ ¬ <University>

According to the example, an input 206 for the language model 110 is determined in a step 203. The input 206 in the example comprises a sentence representing the inconsistent fact, i.e. the subject s, predicate p and object o of this inconsistent fact. In the input, at least one word representing the object o of the inconsistent fact is masked. In the example, in particular due to the axiom ∃ almaMater$^{-}$ ⊑ <University> the input 206 for one of the inconsistent facts 202, e.g. almaMater(<Name of Person>,<Name of City>) comprises:

<Name of Person> has alma mater [Mask], which is a university

According to the example an output of the language model 110 is determined in a step 205. In the example, the output comprises a prediction for the at least one masked word, e.g. <Name of Institution>.

According to the example, a corrected fact 208 is determined depending on the output. The corrected fact 208 is for example:

almaMater(<Name of Person>,<Name of Institution>)

almaMater(<Name of Person>,<Name of City>)almaMater(<Name of Person>,<Name of Institution>) According to the example, the corrected fact 208 replaces the one of the inconsistent facts 202, e.g. is replaced with almaMater(<Name of Person>,<Name of City>)almaMater(<Name of Person>,<Name of Institution>)

Figure 3:
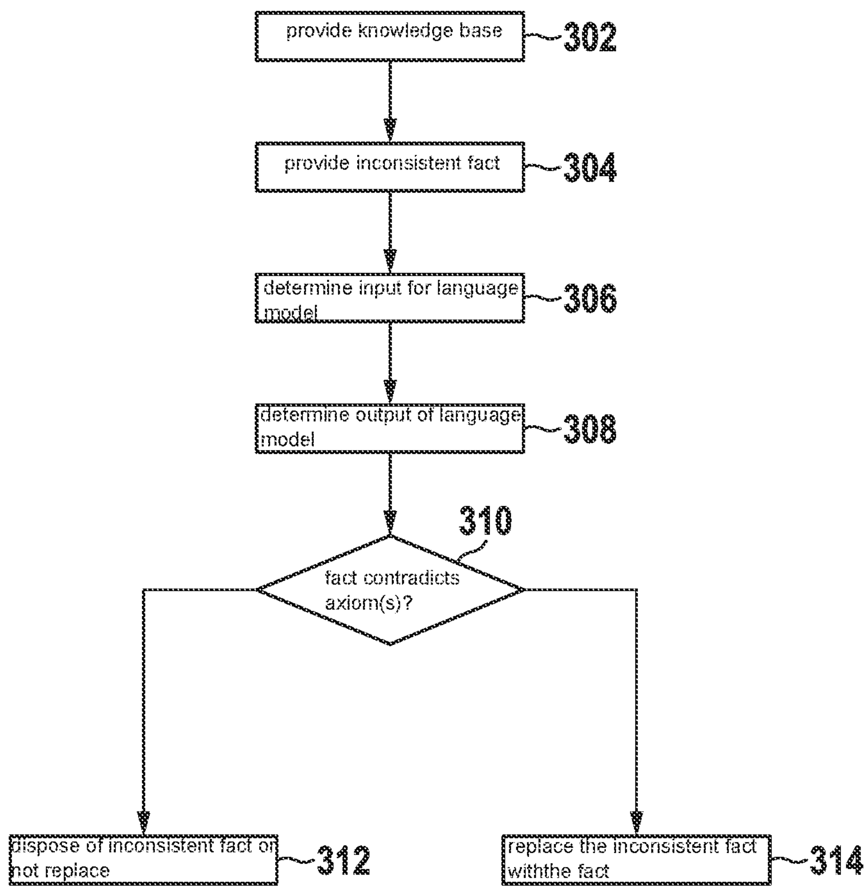
FIG. 3 schematically depicts a method of correcting inconsistent facts, according to an example embodiment of the present invention.

In FIG. 3 a flow-chart of a method for correcting inconsistent facts is depicted.

The method is described for subjects, objects and predicates. Instead of a subject a label provided for the subject e.g. by the knowledge base, may be used. Instead of an object a label provided for the object e.g. by the knowledge base, may be used. Instead of a predicate a label provided for the predicate e.g. by the knowledge base, may be used. The method is described for predicting a predicted object. Instead of the predicted object a predicted label for the predicted object may be used.

The method comprises a step 302.

The step 302 comprises providing the knowledge base, in particular the knowledge graph 106.

The knowledge base, in the example the knowledge base 106, comprises a plurality of facts.

The method may comprise providing the ontology 108 comprising at least one axiom.

The method comprises a step 304.

In step 304, the method comprises providing an inconsistent fact.

The inconsistent fact comprises a subject and a predicate and an object.

Providing the inconsistent fact comprises selecting the inconsistent fact from the plurality of facts.

Providing the inconsistent fact comprises determining a fact that contradicts the at least one axiom as the inconsistent fact.

In practice, the knowledge graph is very large. This verifying and correcting every single triple is impractical. Also, a goal is to avoid modifying correct triples.

Therefore, in a first step, the method may comprise to reduce a search space of incorrect triples by identifying minimal sets of facts that jointly with ontology axioms result in inconsistency.

This is achieved by computing inconsistency explanations for the given input knowledge graph 106 and the ontology 108. That is, if the input knowledge graph 106 is inconsistent with regard to the ontology 108, the method comprises computing minimal explanations that trigger the inconsistency. In an example, where G denotes the knowledge graph 106 and O denotes the ontology 108, an explanation for inconsistency is the smallest inconsistent subset $\varepsilon_G \cup \varepsilon_O$ of $G \cup O$ where $\varepsilon_G \subseteq G$ and $\varepsilon_O \subseteq O$. Inconsistencies are for example determined as described in Tran, T.; Gad-Elrab, M.; Stepanova, D.; Kharlamov, E.; and Strötgen, J. 2020, "Fast computation of explanations for inconsistency in large-scale knowledge graphs," in WWW.

For the facts almaMater(<Name of Person>,<Name of City>), cityOf (<Name of City>,<Name of Country>) comprise $\varepsilon_G$ of the inconsistency explanation of $G \cup O$ presented in FIG. 2, since ∃ cityOf− ⊑ <City> and cityOf(<Name of City>,<Name of Country>) imply that type(<Name of City>,<City>), while ∃ almaMater− ⊑ <City> and almaMater(<Name of Person>,<Name of City>), imply type (<Name of City>,<University>), which contradicts type (<Name of City>,<City>) due to the axiom <City> ⊑ ¬ <University>.

The facts of the inconsistency explanation are processed in the next step.

The method comprises a step 306.

In step 306, the method comprises determining an input for the language model 110.

The input comprises the subject o and the predicate p. The object o is masked in the input.

To correct the facts of the knowledge graph 106 in the pre-computed inconsistency explanations, a pre-trained language model 110 is used. More specifically, for a fact p(s, o) in $\varepsilon_G$ the input is determined as follows:

The object o of the fact is masked. This yields a triple, e.g. (s, p, [MASK]).

The subject s of the triple is converted into natural language. In the example the subject s is converted using labels provided by the knowledge graph 106 for the subject. In an example, the knowledge graph 106 comprises an entity <Name of Person> that characterizes a name of a person and has the type <Person>.

The predicate p is converted to natural language. In one example the predicate p is converted to natural language using textual parsing of the entity <Name of Person>. In one example the predicate p is converted to natural language using predicate labels that are provided from another knowledge graph.

For example, the predicate p, e.g. almaMater, is present in the knowledge graph 106 and a predicate p' indicating the same relation as p is present in another knowledge graph. The predicates p and p' may be named differently. The predicate almaMater is for example labeled with "educated at" in the other knowledge graph.

The input for the fact almaMater(<Name of Person>, <Name of City>) is for example determined from the other knowledge graph educated at (<Name of Person>,<Name of City>):

"<Name of Person> educated at [MASK]."

Wherein the term <Name of City> is masked by [MASK].

Determining the input may comprise providing a context for the subject, and providing the input to additionally comprise the context.

Determining the input may comprises providing a set of subjects, and providing a set of types of subjects. Providing the context comprises selecting the context to comprise a type from the set of types.

The type is selected in one example depending on a result of a comparison of an amount of subjects that are associated with the type to an upper threshold and/or a lower threshold.

According to the example, a subject of the set of subjects is associated with at least on type of the set of types.

The context may comprise information from the inconsistency explanation and the knowledge graph. The input comprising the context produces a language model output of high quality.

In one example, an entity of the knowledge graph 106 has at least one type that is assigned to the entity. The type that is assigned or the types that are assigned to an entity representing a given subject is a source of background knowledge for generating the language model input.

The knowledge graph 106 may have a plurality of entities and a plurality of types that are assigned to one or more of the entities. In one example, the types that are assigned to too many entities that represent subjects are eliminated. For example the type is eliminated if the amount of subjects that are associated with this type exceeds the upper threshold. The upper threshold may be 50%, 75%, or 80% or any other percentage in a range of e.g. 50% to 99% of all subjects.

In one example, the types that are assigned to too few entities that represent subjects are eliminated. For example the type is eliminated if the amount of subjects that are associated with this type is below the lower threshold. The lower threshold may be 1%, 0.5%, 0.1% or any other percentage in a range of e.g. 5% to 0% excluding 0% of all subjects.

From the remaining types, the context may comprise selected ones. In one example, the types for the context are selected as follows:

In particular for controlling a type of the masked part, the context may comprise Ontology-based context.

Providing the context for the subject s may comprise determining the context from an entry for the subject s in another knowledge base.

Providing the context may comprise selecting the context from a set of entries for the subject in another knowledge base depending on whether the context maps to an entity of the knowledge base 106 or not.

In one example it is determined whether an entity of the set of entities is within a given range of types of entities of the knowledge base 106. The range of types is for example provided for the predicate p of the fact or the inconsistent fact.

In one example, the Ontology-based context specifies a desired type of predictions. An exemplary approach for retrieving such context is to detect a range and a domain of the relation, i.e. the predicate p, in an input fact relying on the ontology 108. According to one example, a predicate p and an ontology-defined range for the predicate p are given. A score RLV for a predicate p subject to (s.t.) a given class C is determined as follows:

$$RLV(p, C) = \frac{|p(s, o) \in G \text{s.t.} C(o) \in G|}{|p(s, o) \in G|}$$

This score RLV rates a relevance of the class C for the predicate p.

With this, a range of e.g. the predicate almaMater is retrieved. In DBpedia, this range is EducationalInstitution, and its subclasses (with k=1), including Library, University, etc. These are scored in order to determine whether, for instance, Library or University is a better fitting class for the prediction w.r.t. the given relation.

RLV(almaMater, Library)=(|(x, almaMater, y)∈G, s.t., Class (y)=Library|)/(|(x, almaMater, y)|)=(187/199 k)=0.001. Similarly, RLV(almaMater, University)=(190 k/199 k)=0.95, i.e., 95% of facts with relations almaMater has the object of the type University in DBpedia.

The method comprises a step 308.

In step 308, the method comprises determining an output of the language model 110 depending on the input.

The output comprises a predicted object.

The method may comprise determining a set of objects with the language model 110 and selecting the predicted object from the set of objects.

Selecting the predicted object may comprise determining a confidence score for objects in the set of objects and selecting the object with the highest confidence score as predicted object.

Once the input has been constructed, this input is used to query the language model. In one example, as a result the language model returns as output a list of single-token predictions and for the elements of the list a respective indication of a confidence for this element. The input is for example <Name of Person> is a <Profession>. <Name of Person> is a citizen of <Country>. <Name of Person> educated at [MASK], which is an university.

The context that is added is underlined. <Name of City> is masked by [MASK].

Using the pre-trained language model 110, the following ranked list of tokens (with their confidence score) may be retrieved among e.g. the top-20:

1. mcGill: 0.17
2. university: 0.08
3. harvard: 0.07
6. ucla: 0.03
18. canada: 0.01
20. manitoba: 0.008

The method may comprise a step 310.

The step 310 comprises determining, whether the fact contradicts the at least one axiom or not. If the fact contradicts the at least one axiom, the method may comprise a step 312 of disposing off the inconsistent fact or not replacing the inconsistent fact with the fact.

There may be a case where no valid correction exists or no valid correction is found for inconsistent facts. In this case, the inconsistent facts may be removed.

Otherwise the method may execute a step 314 for replacing the inconsistent fact with the fact.

In one example, a canonical entity is used as a correction for the object o.

The tokens that are top-ranked according to their confidence score are for example mapped to the entities of knowledge graph 106, thus eliminating non-entity mentions and noisy tokens.

For that, an entity linking component, e.g. Wikipedia2Vec may be used. Wikipedia2Vec is described in Yamada, I.; Asai, A.; Sakuma, J.; Shindo, H.; Takeda, H.; Takefuji, Y.; and Matsumoto, Y. 2020, "Wikipedia2Vec: An efficient toolkit for learning and visualizing the embeddings of words and entities from Wikipedia," in EMNLP.

This means retrieving possible entities, i.e. a set of entities, matching a given token.

In case the set of entities comprises multiple entities, an ontology may be used to remove an entity from the set of entities that is of a type that contradicts at least one axiom of the ontology. For example, the type of an entity that shall be used as object in the replacing fact instead of the object of the inconsistent fact must not violate a range of types that are allowed for the predicate p. The predicate p may be the predicate of the inconsistent fact and/or of the replacing fact.

In one example, it is verified that the replacing fact no longer contradicts the ontology 108.

The token mcGill, which is top ranked based on the confidence score, is for example mapped to an entity <mcGillUniversity> in the knowledge graph 106. In this case, for the predicate almaMater, the expected type of the object is for example EducationalInstitution. Thus the object <mcGillUniversity> is valid.

The method comprises the step 314.

In step 314, the method comprises replacing the inconsistent fact with a fact comprising the subject, the predicate and the predicted object.

The method comprises replacing the inconsistent fact in the knowledge base, in the example, the knowledge graph 106, with the fact.

What is claimed is:

1. A computer-implemented method for correcting inconsistent facts in a knowledge base, comprising the following steps:

identifying in the knowledge base an inconsistent fact that includes a subject, a predicate, and an object, wherein the identifying is based on an identification of the inconsistent fact being part of a set of facts indicated by the knowledge base that cannot all be true at once according to ontology rules associated with the knowledge base;

generating from the identified inconsistent fact a masked input for a trained language model, wherein the masked input includes the subject or a label provided for the subject and includes the predicate or a label provided for the predicate, and wherein the generating includes masking the object or a label provided for the object such that the masked input represents an incomplete assertion requiring semantic completion;

generating, by the trained language model, an output depending on the input, wherein the output includes a plurality of candidate textual representations that are each associated with a respective confidence value and that are generated by the trained language model as respective semantic completions of the masked input, the generating including the trained language model performing proposals from within a semantic output space that is conditioned, prior to the proposals, by constraints driven by the ontology rules, without limitation of the generated candidates to having been previously contained in the knowledge base;

selecting, based on the confidence values, a predicted object or a predicted label for the predicted object from among the plurality of candidate textual representations;

performing a mapping to find an entity representation of the knowledge base to which the predicted object or predicted label can be mapped; and executing a knowledge base update process that is predefined to:

when at least one of the candidates is identified that satisfies the ontology rules, replace the inconsistent fact with a fact including the subject, the predicate, and the predicted object that is selected from the candidates, thereby restoring consistency of the knowledge base with respect to the ontology rules; and when no candidate satisfying the ontology rules is identified, automatically remove the inconsistent fact from the knowledge base.

2. The method according to claim 1, further comprising: providing the knowledge base, wherein the knowledge base includes a knowledge graph, wherein the knowledge base includes a plurality of facts, wherein identifying the inconsistent fact includes selecting the inconsistent fact from the plurality of facts.

3. The method according to claim 1, wherein generating the masked input further includes providing a context for the subject and including the context in the masked input.

4. The method according to claim 3, wherein the providing of the context for the subject includes: determining the context from an entry for the subject in another knowledge base and/or selecting the context from a set of entries for the subject in another knowledge base depending on whether the context maps to an entity of the knowledge base that is within a given range of types of entities of the knowledge base that is provided for the predicate of the inconsistent fact.

5. The method according to claim 3, wherein generating the masked input includes providing a set of subjects and a set of types of subjects, wherein each subject of the set is associated with at least one type of the set of types, and wherein the providing of the context includes selecting the context to include a type from the set of types, the type being selected depending on a result of a comparison of a number of subjects that are associated with the type to an upper threshold and/or a lower threshold.

6. The method according to claim 1, wherein:

the selecting of the predicted object or predicted label includes selecting, from among the candidate textual representations, the object or label having a highest one of the confidence scores.

7. The method according to claim 1, further comprising:

providing an ontology including at least one axiom, wherein the identifying of the inconsistent fact includes determining that the inconsistent fact contradicts the at least one axiom.

8. The method according to claim 1, further comprising:

determining a set of inconsistent facts including the inconsistent fact and correcting each of the inconsistent facts in the set.

9. An apparatus configured to correct inconsistent facts in a knowledge base, the apparatus comprising:

at least one processor; and at least one non-transitory memory, wherein the at least one memory is configured for storing a knowledge base including a knowledge graph, and an ontology, a language model, and computer-readable instructions for correcting inconsistent facts in the knowledge base, the instructions, when executed by the at least one processor, causing the at least one processor to perform the following steps:

identifying in the knowledge base an inconsistent fact that includes a subject, a predicate, and an object, wherein the identifying is based on an identification of the inconsistent fact being part of a set of facts indicated by the knowledge base that cannot all be true at once according to ontology rules associated with the knowledge base;

generating from the identified inconsistent fact a masked input for a trained language model, wherein the masked input includes the subject or a label provided for the subject and includes the predicate or a label provided for the predicate, and wherein the generating includes masking the object or a label provided for the object such that the masked input represents an incomplete assertion requiring semantic completion;

generating, by the trained language model, an output depending on the input, wherein the output includes a plurality of candidate textual representations that are each associated with a respective confidence value and that are generated by the trained language model as respective semantic completions of the masked input, the generating including the trained language model performing proposals from within a semantic output space that is conditioned, prior to the proposals, by constraints driven by the ontology rules, without limitation of the generated candidates to having been previously contained in the knowledge base;

selecting, based on the confidence values, a predicted object or a predicted label for the predicted object from among the plurality of candidate textual representations;

performing a mapping to find an entity representation of the knowledge base to which the predicted object or predicted label can be mapped; and executing a knowledge base update process that is predefined to:

when at least one of the candidates is identified that satisfies the ontology rules, replace the inconsistent fact with a fact including the subject, the predicate, and the predicted object that is selected from the candidates, thereby restoring consistency of the knowledge base with respect to the ontology rules; and when no candidate satisfying the ontology rules is identified, automatically remove the inconsistent fact from the knowledge base.

10. A non-transitory computer-readable medium on which is stored a computer program for correcting inconsistent facts in a knowledge base, the computer program, when executed by one or more processors, causing the one or more processors to perform the following steps:

identifying in the knowledge base an inconsistent fact that includes a subject, a predicate, and an object, wherein the identifying is based on an identification of the inconsistent fact being part of a set of facts indicated by the knowledge base that cannot all be true at once according to ontology rules associated with the knowledge base;

generating from the identified inconsistent fact a masked input for a trained language model, wherein the masked input includes the subject or a label provided for the subject and includes the predicate or a label provided for the predicate, and wherein the generating includes masking the object or a label provided for the object such that the masked input represents an incomplete assertion requiring semantic completion;

generating, by the trained language model, an output depending on the input, wherein the output includes a plurality of candidate textual representations that are each associated with a respective confidence value and that are generated by the trained language model as respective semantic completions of the masked input, the generating including the trained language model performing proposals from within a semantic output space that is conditioned, prior to the proposals, by constraints driven by the ontology rules, without limitation of the generated candidates to having been previously contained in the knowledge base;

selecting, based on the confidence values, a predicted object or a predicted label for the predicted object from among the plurality of candidate textual representations;

performing a mapping to find an entity representation of the knowledge base to which the predicted object or predicted label can be mapped; and executing a knowledge base update process that is predefined to:

when at least one of the candidates is identified that satisfies the ontology rules, replace the inconsistent fact with a fact including the subject, the predicate, and the predicted object that is selected from the candidates, thereby restoring consistency of the knowledge base with respect to the ontology rules; and when no candidate satisfying the ontology rules is identified, automatically remove the inconsistent fact from the knowledge base.

* * * * *